United States Patent
Tsushima et al.

(10) Patent No.: US 6,516,391 B1
(45) Date of Patent: Feb. 4, 2003

(54) MULTIPROCESSOR SYSTEM AND METHODS FOR TRANSMITTING MEMORY ACCESS TRANSACTIONS FOR THE SAME

(75) Inventors: Yuji Tsushima, Kokubunji (JP); Hideya Akashi, Kunitachi (JP); Keitaro Uehara, Kokubunji (JP); Naoki Hamanaka, Tokyo (JP); Toru Shonai, Hachioji (JP); Tetsuhiko Okada, Hachioji (JP); Masamori Kashiyama, Isehara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/523,737

(22) Filed: Mar. 13, 2000

(30) Foreign Application Priority Data

Mar. 17, 1999 (JP) .......................................... 11-071403

(51) Int. Cl.⁷ .............................................. G06F 12/00
(52) U.S. Cl. ...................... 711/146; 711/120; 711/105; 711/167; 711/213
(58) Field of Search ................................ 711/146, 120, 711/105, 167, 119, 121, 141, 137, 204, 213

(56) References Cited

U.S. PATENT DOCUMENTS

| | | | | | |
|---|---|---|---|---|---|
| 5,715,203 A | * | 2/1998 | Uchida | ......................... | 365/203 |
| 5,778,435 A | * | 7/1998 | Berenbaum et al. | ........ | 711/137 |
| 5,893,917 A | * | 4/1999 | Derr | ............................ | 711/105 |
| 5,895,487 A | * | 4/1999 | Boyd et al. | ................... | 711/122 |
| 5,923,859 A | * | 7/1999 | Melo et al. | ................... | 710/113 |
| 5,987,579 A | * | 11/1999 | Nishtala et al. | .............. | 711/169 |
| 6,098,156 A | * | 8/2000 | Lenk | ............................ | 711/146 |
| 6,148,416 A | * | 11/2000 | Masubuchi | ................... | 714/15 |
| 6,253,297 B1 | * | 6/2001 | Chauvel et al. | .............. | 711/167 |
| 6,263,407 B1 | * | 7/2001 | Arimilli et al. | .............. | 711/144 |

* cited by examiner

Primary Examiner—Hong Kim
(74) Attorney, Agent, or Firm—Antonelli, Terry, Stout & Kraus, LLP

(57) ABSTRACT

In a multiprocessor arranged in accordance with either NUMA or UMA in which a plurality of processor nodes containing a plurality of processor units are coupled to each other via a network, a cache snoop operation executed in connection with a memory access operation is performed at two stages, namely, local snoop operation executed within a node, and global snoop operation among nodes. Before executing the local snoop operation, an ACTV command for specifying only an RAS of a memory is issued to a target node having a memory to be accessed, and the memory access is activated in advance. A CAS of a memory is additionally specified and a memory access is newly executed after the ACTV command has been issued and then a memory access command has been issued. When there is such a possibility that a memory to be accessed is cached in a processor node except for a source node, this memory access command is issued to be distributed to all nodes so as to execute the global snoop operation. On the other hand, when there is no possibility that the memory to be accessed is cached, this memory access command is transferred only to the target node in yan one-to-one correspondence.

10 Claims, 6 Drawing Sheets

MULTIPROCESSOR SYSTEM AND METHODS FOR TRANSMITTING MEMORY ACCESS TRANSACTIONS FOR THE SAME

BACKGROUND OF THE INVENTION

The present invention is related to a multiprocessor system with employment of a memory element in which a DRAM is used in a main memory and a cache. More specifically, the present invention is directed to a mechanism for shortening time defined from an access request for the memory element up to a data arrival (will be referred to as "memory access latency" hereinafter), and also to a method for transmitting a memory access transection used in this mechanism.

Operation speeds of recently available processors are very high, and these processors are normally provided with built-in type cache memories so as to reduce differences in operation speeds between these processors and external memories. While the built-in type cache memories are hit, processors are capable of executing commands in high efficiencies and thus capable of maintaining high performance. In such a case that either a command or data required to execute an instruction is not present within this built-in type cache memory, and a thus a cache miss occurs, time used to access a memory externally provided with the processor (will be referred to as "memory access latency" hereinafter) is prolonged, and this time may induce lowering of the performance, since the processor cannot effectively execute the instruction.

Furthermore, since this memory access latency is required so as to check as to whether or not a subject line for cache miss is cached by another processor before executing a memory access operation when a multiprocessor is constituted, generally speaking, there is such a trend that this memory latency is increased, rather than that when a single processor is arranged. The memory access latency may give serious influences to the performance.

While processors containing a plurality of cache memories are coupled to a system bus of the processors so as to constitute a processor node, a description will now be made of a memory access sequence executed in a multi-processor system in which a plurality of processor nodes are coupled to a memory via a network as follows:

(1). A cache miss occurred in a processor, and a memory access request used to access this relevant address is produced.

(2). To send a memory access request to a memory, a processor joins a bus arbitration in order to acquire a use right of a system bus.

(3). If the system bus use right is acquired, then the memory access request produced at (1) is sent to the system bus. At this time, other processors coupled to the system bus check as to whether or not data of an address contained in the memory access request is cached, and then returns a checked result to such a processor which issues the memory access request.

(4). When as a result of (3), the memory access operation must be carried out, the memory access request is sent out to the network. As to sending of the memory access request to the network, there are some cases that the arbitration for obtaining the use right must be carried out similar to (2), depending upon the structure.

(5). A node except for the processor node which has sent out the memory access request receives this request from the network, and checks whether or not a processor provided within this node caches data of the subject address of this request. The node notifies the checked result to the node which has sent out the memory access request.

(6). When as a result of (5), the memory access operation is available, a row address (RAS) and a column address (CAS) are sequentially inputted to the memory so as to perform the memory access operation, so that data access operation is carried out.

(7). The result of data access (6) (data when read system request is issued) is notified to the node which has issued the memory access request, and also is notified to the processor within this node.

Description of Memory First Read System

Conventionally, the memory first read system has employed. That is, in order to avoid the performance deterioration caused by the memory access latency in the memory access operation executed in accordance with the above-explained sequence, the data reading operation involved in (6) is carried out before other processor checks the cache state in (3) and (5) so as to hide the time required to read the data. As to this memory first read system, the below-mentioned methods have been proposed, depending upon starting timing of data reading operation.

In the method (will be referred to as "first prior art" hereinafter) described in U.S. Pat. No. 5,778,435, the memory access operation is commenced before the cache miss occurs in the cache built in the processor. In this method, the address of the built-in cache miss is subsequently predicted by the address series of the built-in cache miss to be used.

In the method (will be referred to as "second prior art" hereinafter) disclosed in U.S. Pat. No. 5,987,579, in such a case that the cache access miss occurs in the cache built in the processor and then the address for accessing the memory is sent out to the processor bus, this address is subdivided into an RAS and a CAS, and upon receipt of the RAS, this address is outputted to the memory before receiving the checked result of the cache state. The control operation is carried out as to whether or not the CAS is outputted in response to the checked result of the cache state, and the data access operation for the memory is controlled.

Since the data first reading operation is performed based on the address prediction in the above-explained first prior art, in such a case that the address when the actual cache miss occurs is different from the predicted address, the data must be canceled based upon the prediction, and the data must be reread by the address based on the actual cache miss. As a result, there are the following problems. That is, the throughput of memory is consumed. Also, while the address series of the past cache miss must be stored in order to predict the address, the mechanism for predicting the subsequent cache miss address from this stored address series is required, resulting in the complex system.

Also, there is another problem related to the first prior art. That is, both processors read the data before the access to the memory is permitted. In the case that a plurality of memory access requests with respect to the same address are processed, there is a further problem. That is to say, the ordering process of these plural requests becomes complex, and also the ordering process of the first-read data becomes complex, resulting in a difficult control.

Since all of the addresses are required to check the cache state in the above-explained second prior art, the address subdivided into both the RAS and the CAS must be distributed to all of the processors. Thus, there is such a problem that the busy rate of the address path is increased.

SUMMARY OF THE INVENTION

To solve the above-described problems, an object of the present invention is featured by achieving the following items as to a memory access operation:

(1). A memory throughput is not consumed.

(2). A control for ordering requests and a control for ordering data can be made simple.

(3). A busy rate of an address path is not increased.

(4). A memory latency is reduced.

To achieve the above-explained object, in accordance with the present invention, a memory access request in connection with a cache miss of a cache built in a processor is separated into an ACTV comment and a memory access command. The ACTV command activates a memory in advance without executing a data access operation. The memory access command is used to actually read/write data from the memory.

Now, a description will be made of timing at which the respective ACTV command and memory access command are issued. The ACTV command is issued when an address to be accessed is outputted from a processor, precisely speaking, in such a case that the address to be accessed is decoded, and then such a node is judged, to which a memory having data of this address is connected. The ACTV command is transferred to the judged target node by way of an one-to-one transfer. Since this ACTV command causes only RAS to be inputted into the memory, no data transfer between the memory and the ACTV command occurs. Also, this ACTV command corresponds to such a command which is issued to the memory without being adversely influenced by address coincident checking between this ACTV command and the preceding memory access command, and a cache united control.

Also, a memory access command is transferred to a target node in an one-to-one correspondence in the case that an address to be accessed is outputted from a processor, cache states in another processor and a node are checked, and there is no possibility that other nodes are cached. When there is such a possibility that other nodes are cached, the memory access command is distributed to all of the nodes. In the node which receives this memory access command, a process operation required to check the cache unity is carried out, and then, the checked result is returned. Since the results of cache united controls are totalized, the cache states in the all nodes are judged. The memory node which receives both the ACTV command and the memory access command judges as to whether or not the data should be transferred from the memory under cache states of all of the nodes, and reads the data from the memory if necessary.

As a consequence, since the input operation of RAS with respect to the memory is carried out by way of the one-to-one transfer without waiting for the result of the cache united control, the time defined from issuing of the memory request for the processor up to accessing of the data can be shortened, while suppressing an increase in a busy rate of an address path.

DESCRIPTION OF THE EMBODIMENTS

Figure 1:
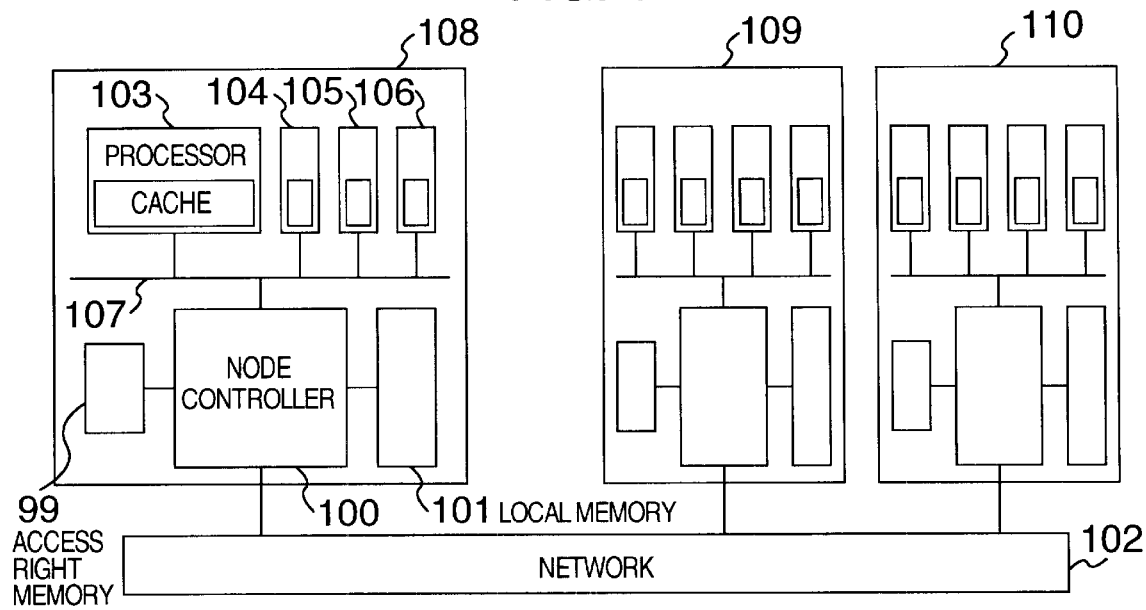
FIG. 1 a schematic block diagram for representing an overall arrangement of a system according to an embodiment of the present invention.

A system shown in FIG. 1 corresponds to a multiprocessor system constituted by processor nodes 108, 109, 110, which are coupled via a network 102 to each other. The processor node 108 contains processors 103, 104, 105, 106 including a cache; a node controller 100; a local memory 101; and an access right memory 99. Other processor nodes own the same structures as that of the processor node 108. A main memory of the multiprocessor system is arranged by local memories of the respective processor nodes.

In this embodiment, a total number of these processor nodes is selected to be 3 nodes, and a total number of the processors per one processor node is 4 processors. However, there is no limitation in the total quantity of the nodes and the total quantity of the processors. Also, as to the structure of the main memory, in this embodiment, the NUMA (Non Uniform Memory Architecture) memory structure is represented in which memories are distributed/arranged to the respective processors. Alternatively, the UMA (Uniform Memory Architecture) memory structure may be employed in which memories are not arranged in processor nodes, but are arranged on a network.

Figure 5:
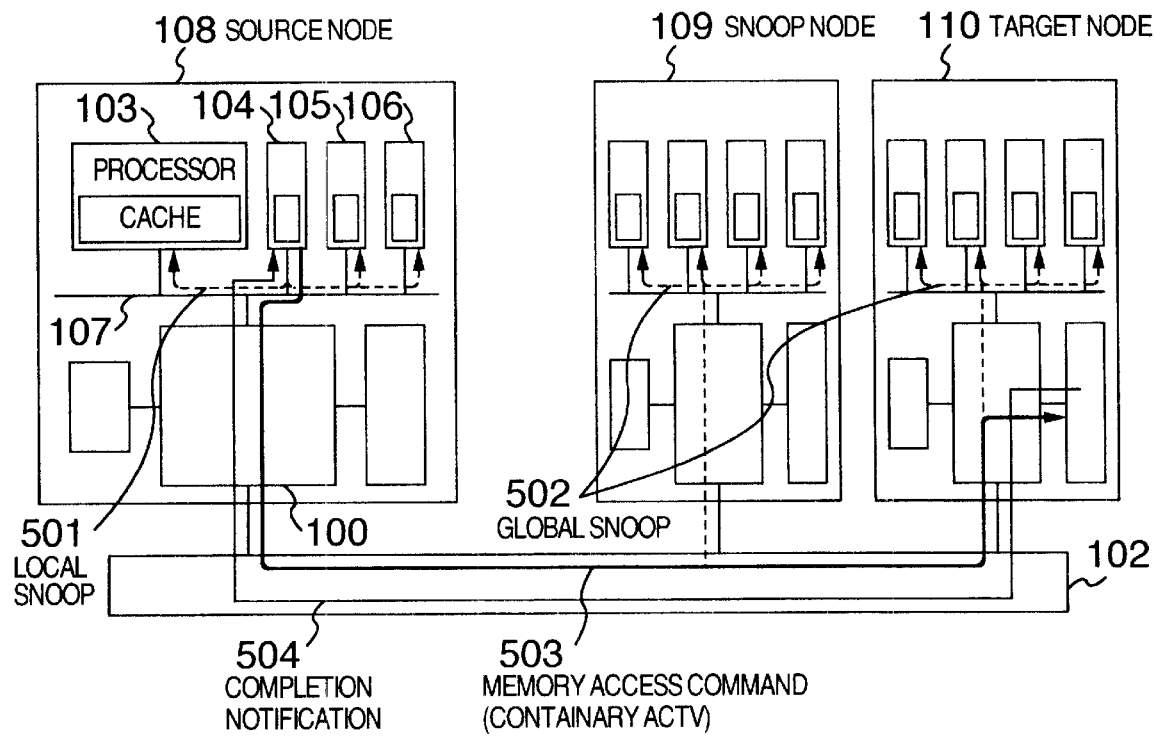
FIG. 5 is a conceptional diagram for representing a memory access processing sequence executed in the above-explained embodiment.

FIG. 5 indicates a memory access processing operation executed in the multiprocessor system according to this embodiment. In this embodiment, the processor 104 contained in the processor node 108 accesses the memory of the processor node 110. In other words, the processor node 108 corresponds to a source node, whereas the processor node 110 containing a memory accessed by a memory access code corresponds to a target node. A node other than the source node and the target node, for example, the processor node 109 will be referred to as a snoop node in the drawing.

Figure 6:
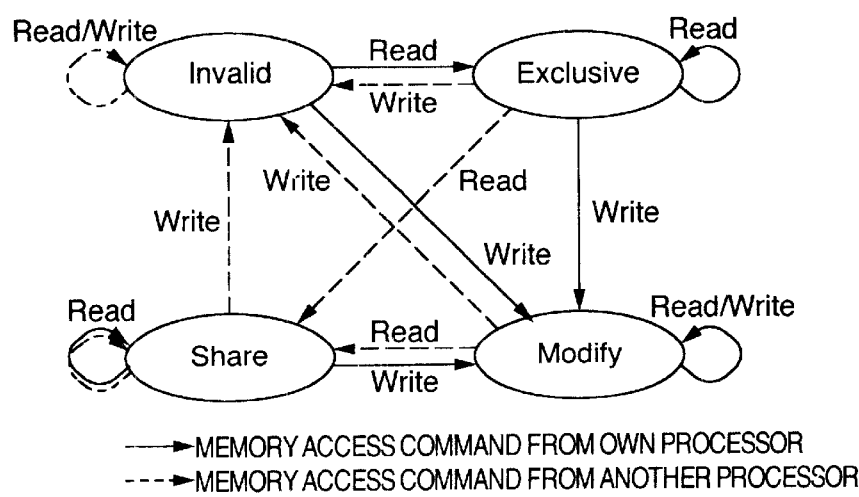
FIG. 6 is a state transition diagram for showing a cache condition of the above-explained embodiment.

Also, in this embodiment, operation of the cache is performed in accordance with an MESI protocol shown in FIG. 6. A plurality of processors can cache the same line, and this caching state will be referred to as a "Shared." Such a state that the same line is read only by a single processor and cached will be referred to as an "Exclusive", and a line which is rewritten by latest data will be referred to as a "modified." Also, both in the case of "Modified" and the case of "Exclusive", a subject line is not allowed to be cached by other processors. A state such that the same line is not cached will be referred to as an "Invalid." The above-explained four states are transferred in response to a memory access from a local processor, or a memory access from a remote processor in the manners as shown in FIG. 6. Furthermore, a cache united control is performed which also contains the memory accesses required to transfer the states within the respective caches, as indicated in FIG. 6. For example, in the case of a memory write command, a processor under "Exclusive" cache state rewrites the relevant cache line, and then invalidates this cache.

When a memory access command is issued from the processor 104 within the source node 108 to the system bus 107, other processors 103, 105, 106, which are coupled to the same system bus, check cashing states of subject addresses. In the case that the memory access corresponds to a read access and furthermore a read subject is cached by any one of these processors 103, 105, 106, this memory access is accomplished by executing a reading process operation from this cache. It should also be noted that if the caching state of this line is the caching state other than the "Shared" caching state, then the cache united control which can substitute the "Shared" caching state is required. In other cases, it is so judged that the memory access command must be transferred to another processor node in addition to the cache united control performed within the source node as indicated in FIG. 6. the above-described process operation corresponds to a local snoop 501 indicated by a broke line in FIG. 5.

On the other hand, the memory access command sent to the system bus 107 is accepted by the node controller 100 of the relevant node. As a result, the node controller 107 specifies a target node from the subject address of this memory access without waiting for the result of the above-described local snoop, and transmits an ACTV command 503 in an one-to-one correspondence with respect to a target node (namely, target node 108). The ACTV command contains only a row address (will be referred to as an "RAS" hereinafter) within a memory address of an access subject. Otherwise, this ACTV command contains both a row address (RAS) and a column address (will be referred to as a "CAS" hereinafter), but this CAS is invalid.

The target node receives the ACTV command to issue an RAS to a memory.

On the other hand, the node controller 107 of the source node 108 retrieves an access right memory 99 by using an access subject address. This memory retrieve operation is also carried out before the result of local snoop is obtained, namely is performed in parallel to the local snoop. A memory content of the access right memory 99 will be explained later. That is, information as to whether or not each of the nodes owns an access right is registered into the access right memory 99 as to a plurality of lines of the main memory. As a result of this retrieve operation, in such a case that as to the lines containing the access subject address, either the own node does not have the access right or no access right is registered into the access right memory, there are certain possibilities that the lines are cached by other nodes. As a consequence, memory access commands are distributed to all nodes other than the own node. When the own node has the access right, since there is no such a possibility that the lines are cached by other nodes, the memory access commands are transmitted in an one-to-one correspondence to the target node, namely the processor node 110 in this embodiment. When the memory access commands are distributed, both the snoop node 109 and the target node 110 which receive the memory access commands check a caching state of data at the relevant address of the processor coupled to the system bus within the own node, and execute the necessary cache united controls based on FIG. 6. This process operation corresponds to a global snoop 502.

The result of the local snoop previously executed in the source node 108 is notified to the target node. Also, the result of the global snoop is returned to the source node, and furthermore, returned to the target node. In the case that the memory access command is transmitted only to the target node in an one-to-one correspondence, the target node 110 waits for only the notification of the result of the local snoop, and when this notified result indicates a need of a memory access operation, this target node 110 executes the memory access operation.

On the other hand, in such a case that the memory access command is distributed to a plurality of nodes, the target node 110 executes the memory access operation, if required, at a time instant when the result of the global snoop in the own node and the result of the global snoop in the snoop node 109 are collected. In any one of the above-explained cases, since the RAS has already been issued to the local memory at a time instant when the ACTV command is received, the memory access operation is carried out at this local memory in such a manner that the CAS is issued from the node controller to the memory. When either the data is read out from the local memory or written into the local memory, the target node returns a completion notification 504 (containing data when data is read) to the processor 104 of the source node so as to complete the memory access operation.

It should be understood that since the inventive idea of the present invention is directed to the memory access operation in the above-described memory access processing operation, such a case that the memory access operation is not required is omitted. For example, as a result of the local snoop and also a result of the global snoop, the data transfer between the caches occurs.

Figure 2:
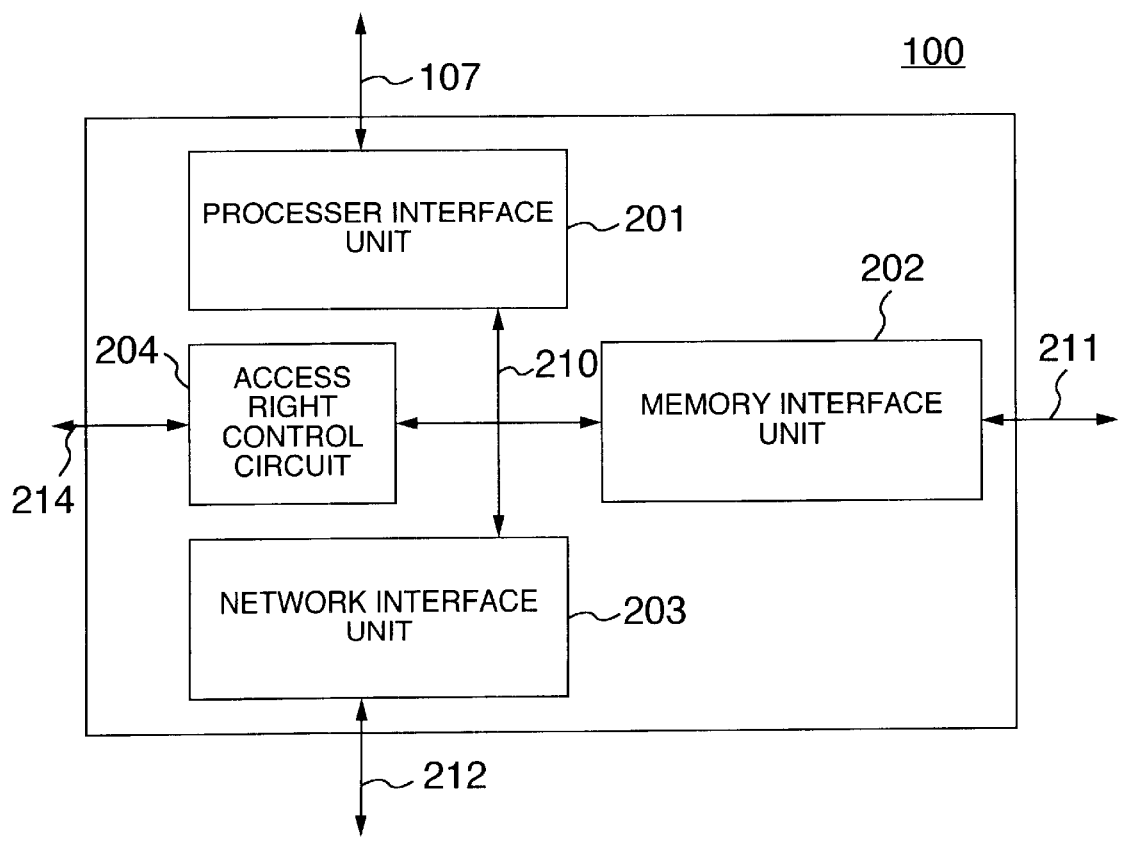
FIG. 2 is a schematic block diagram for showing an arrangement of a node controller according to the above-described embodiment.

FIG. 2 represents an arrangement of the node controller shown in FIG. 1. The node controller contains a processor interface unit 201, a memory interface unit 202, a network interface unit 203, and an access right control circuit 204. These units are coupled via a signal line 210 to each other. Both a memory access command and data are transmitted/received via this signal line 210 among these units.

The access right control circuit 204 retrieves the access right memory 99 to execute an access right control in response to this retrieved result, and also manages the memory content of the access right memory 99. In this case, the access right memory 99 owns an entry into which a tag and information are registered, and has a memory capacity. The tag is made in correspondence with the cache line saved in the main memory. The information indicates as to whether or not the own node has an access right of this relevant cache line. The memory capacity is capable of registering thereinto plural cache lines several times (for example, 4 times) larger than a total number of lines which can be cached by the processor of the own node. As a result, as to such a line which is not actually present in the own node, the access right of the own node can hold.

An algorithm of an access right management executed by the access right control circuit 204 in this embodiment is defined as follows:

(1). A processor of an own node issues a memory access command required to perform a cache united control. In the case that as a result of issuing a global snoop request to other nodes, all of other nodes do not own an access right of this memory block, a state of the own node is registered with having an access right.

(2). Upon receipt of the global snoop request in connection with the memory access command from another node, the access right memory of the own node is retrieved, and in such a case that an entry with respect to a subject block of a snoop is present and an access right is present, the state of this access right is changed into a state of no access right.

As a consequence, when the access right control circuit 204 receives the global snoop request made from another node via the network interface unit, this access right control circuit 204 retrieves the access right memory 99 via a signal line 214, changes the data for indicating as to whether or not the access right is owned, if necessary, and notifies this result via the network interface unit to other nodes.

Also, when the access right control circuit 204 receives the memory access command of the own node from the processor interface unit, this access right control circuit 204 retrieves the access right memory, and returns the retrieve result to the processor interface unit.

The processor interface unit 201 receives a memory access command sent from a processor via the system bus 107, and when the content of the memory access command is a local memory access, the process interface unit 201 transfers this local memory access to the memory interface 202. In the case that the memory access corresponds to an access to a memory of another node, the processor interface unit 201 owns such a function that an ACTV command is produced to be issued to the network interface 203, and an address contained in the memory access command is transferred to the access right control circuit 204 in order to judge as to whether or not an access right is present. Furthermore, the processor interface unit 201 owns such a function. That is to say, if a retrieved result returned from the access right control unit 204 corresponds to "access right is present", then a memory access command is issued via the signal line 210 to a target node. If a retrieved result returned from the access right control unit 204 corresponds to "access right is not present", then a memory access command is issued via the signal line 210 to all nodes except for the own node. Also, the processor interface unit 201 owns such a function. That is to say, the processor interface unit receives a completion notification 504 corresponding to the issued memory access command from the network interface unit 203, and returns data and the like via the system bus to the processor which has issued the memory access request, if necessary.

Furthermore, this processor interface unit 201 owns the following function.

In other words, when the processor interface unit 201 receives a global snoop request issued from another node from the network interface unit, this processor interface unit 201 checks a cache state of a processor coupled to the system bus, notifies the checked result of the cache state to the memory interface unit 202, and also notifies this checked result via the network interface to other nodes.

The memory interface unit 202 receives via the signal line 210 both an ACTV command and a memory access command from either the processor interface unit 201 or the network interface unit 203. When the ACTV command is received, the memory interface unit 202 decodes an address contained in this ACTV command, and sends out an RAS via the signal line 211 to a proper memory bank. As to also a memory access command, the processor interface unit 201 owns such a function that a CAS is issued to a subject memory bank based upon a decoded result of an address contained in this memory access command, and data is sent/received via the signal line 211.

The network interface unit 203 owns such a function that this network interface unit intermediates via the signal line 210 among the processor interface unit 201, the memory interface unit 202, and the access right control circuit 204 with respect t o the network 102. The network interface unit 203 transfers an ACTV command sent from another node to the memory interface unit 202. Similarly, the network interface unit 203 transfers a memory access command which is received by an one-to-one transfer to the memory interface unit 202. When the network interface unit 203 receives memory access commands which are distributed to a plurality of nodes, the network interface unit 203 sends out this received memory access command to the processor interface unit 201 by adding such information for indicating that this memory access command is a global snoop request. Furthermore, when an address to be accessed is present within the local memory of the own node, the network interface unit 203 sends out this memory access command also to the memory interface unit 202. Also, the network interface unit 203 owns a function such that both an ACTV command directed to another node from this node and a memory access command are transferred to a network, and another function that a memory access completion notification (also may contain data) is transferred to the network, and this memory access completion notification is notified from the memory interface with respect to the memory access command issued from another node.

Figure 3:
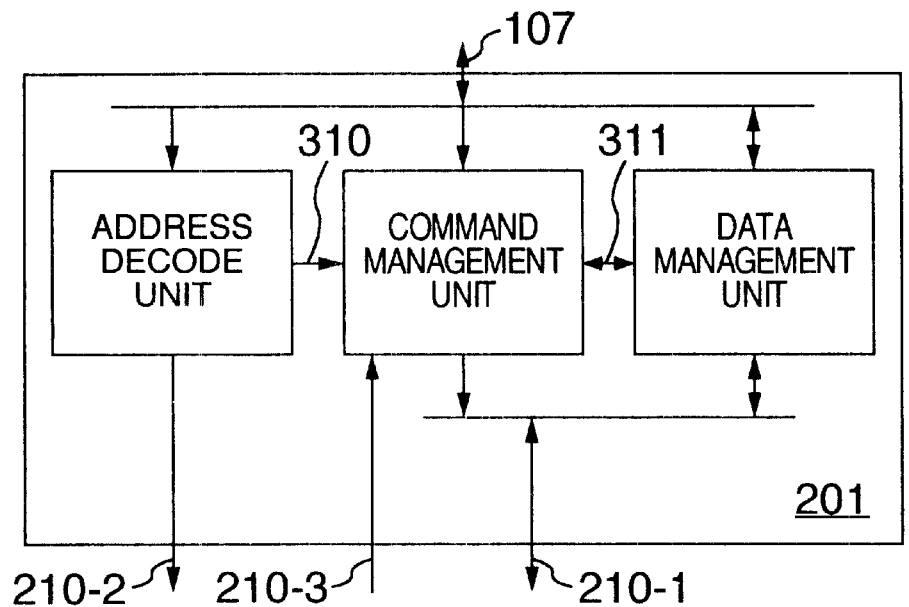
FIG. 3 is schematic block diagram for indicating an arrangement of a processor interface unit according to the above-described embodiment.

As indicated in FIG. 3, the processor interface unit contains an address decode unit 301, a command management unit 302, and a data management unit 303.

The address decode unit 301 owns such a function. That is, only a memory access command sent from the system bus 107 is inputted, and this address decode unit 301 decodes an address contained in this memory access command, and issues an ACTV command with respect to a target node (also may contain a local mode) holding this address as a local memory. In the case that the target node is the local node, the ACTV command is outputted via a signal line 210-2 to a memory controller. In the case that the target node is a node other than the local node, the ACTV command is outputted via the signal line 210-2 to the network interface 203. Also, the decoded result is notified via a signal line 310 to the command management unit. Furthermore, in the case that the target node is a node other than the local node, the address contained in the memory access command is transferred to the access right control circuit 204 in order to judge as to whether or not the access right is present. It should be noted that the address decoding operation is commenced at a time instant when the address contained in the memory access command is outputted to the system bus 107, and when the decoded result is made, the address decode unit immediately issues the ACTV command to the target unit.

The command management unit 302 enters thereinto the memory access command sent from the system bus 107, the above-described address decoded result, and the retrieved result of the access right memory sent from the signal line 210-3. As a result of the local snoop with respect to the inputted memory access is required, the command management unit 302 formally issues this memory access command. When the address decoded result indicates the local node, the memory access command is outputted to the memory interface unit, whereas when the address decoded result does not indicate the local node, the memory access command is outputted to the network interface unit. In the latter case, the transfer destination of the memory access command is changed which is issued in response to the retrieved result of the access right memory. In such a case that the own node has the access right, the transfer destination is only the target node. In the case that the own node has no access right, or the access right of the own node is not registered into the access right memory 99, the transfer destination corresponds to all nodes other than the own node.

Also, the command management unit 302 saves the memory access command issued from this node until the completion notification of this memory access command is received, and transfers the completion notification via the system bus 107 also to a processor when the execution of the memory access command is accomplished.

Furthermore, this command management unit 302 owns the following function. That is to say, when the global snoop request is received from the network interface unit, the command management unit 302 checks the cache state of the processor contained in the own node. Then, the command management unit 302 notifies this checked result to both the network interface unit and the memory interface unit.

The data management unit 303 uses both the system bus 107 and the signal line 210 as an input and an output. An input supplied from the system bus 107 corresponds to write data supplied from the processor related to a memory write command among the memory access commands, and this write data is outputted by using the signal line 210.

An input supplied from the signal line 210 corresponds to return data supplied from the memory related to a memory read command among the memory access commands, and this return data is outputted by using the system bus 107. It should also be noted that sending of the above-described write data to the signal line 210 must be carried out in synchronism with sending of a write command corresponding to this write data. To this end, the data management unit owns such a function that command sending timing via the signal line 311 is received/sent to the command management unit.

In the case of the local memory access operation, the data is sent to the memory interface unit via the signal line 210, whereas in the case of the remote memory access, the data is sent via the signal line 210 to the network interface unit in a similar manner to the write command corresponding to this data.

Figure 4:
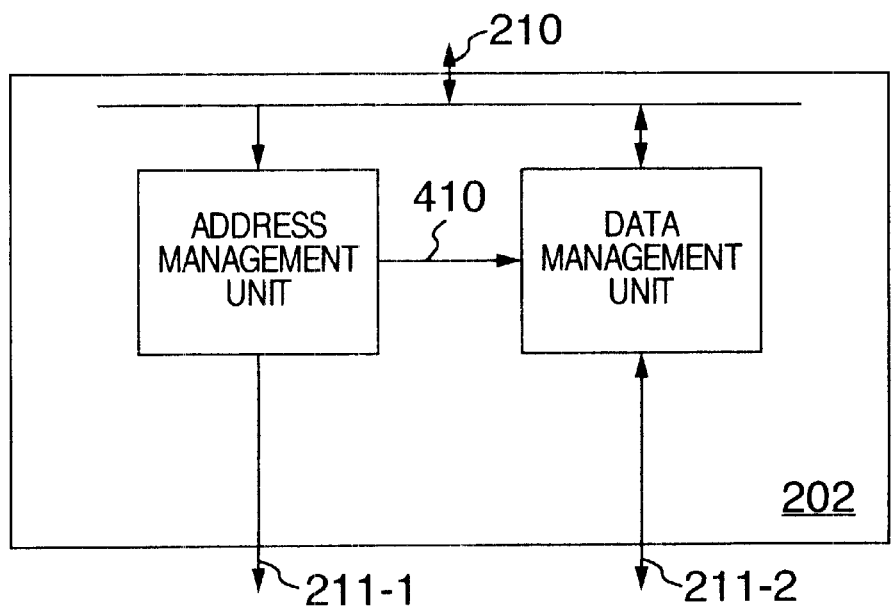
FIG. 4 is a schematic block diagram for showing an arrangement of a memory interface unit according to the above-described embodiment.

FIG. 4 shows an arrangement of the memory interface unit 202. This memory interface unit 202 contains an address management unit 401 and a data management unit 402. The address management unit 401 is to save both a command and an address to be accessed with respect to a memory connected to this memory interface unit 202. The data management unit 402 is to save both write data with respect to this memory and read data which is read out from this memory.

The address management unit 401 owns a function such that this address management unit 401 receives a command containing an address for this memory via the signal line 210 from either a processor interface unit or a network interface unit, and then sends out both this received command and the address thereof via a signal line 211-1 to the memory. It should also be noted that as to an ACTV command, the address management unit 401 sends out only RAS to the memory. In the case that the address management unit 401 receives such information indicative of being a global snoop request together with a memory access command, the address management unit 401 totalizes the snoop results of the respective nodes, and when the totalized result corresponds to a permission of a memory access operation, this address management unit 401 sends out a subject address of a memory access.

The data management unit 402 owns a function such that this data management unit 402 receives write data for this memory via the signal line 210 from either a processor interface unit or a network interface unit, and then sends out this received data via a signal line 211-2 to the memory. It should be understood that as to sending operation of the write data, in order to match this data sending operation with the timing at which the write command is entered into the memory, the address management unit must receive the notification of sending out this write command via a signal line 410.

Also, the data management unit 402 owns the following function. That is to say, in the case that the read command is sent out from the address management unit to the memory, this data management unit temporarily save the return data from the memory, and then returns the data via the signal line 210 to either the processor interface unit or the network interface unit, corresponding to the send source of this read command.

The node controller which has been explained with reference to FIG. 2 through FIG. 4 may be arranged by a set of plural integrated circuits. Apparently, the respective integrated circuits need not be made in correspondence with the circuit blocks shown in these drawings.

Now, a comparison is made between the normal memory access processing operation without using the ACTV command (namely, conventional memory access processing operation) and the memory access processing operation according to the present invention.

Figure 7:
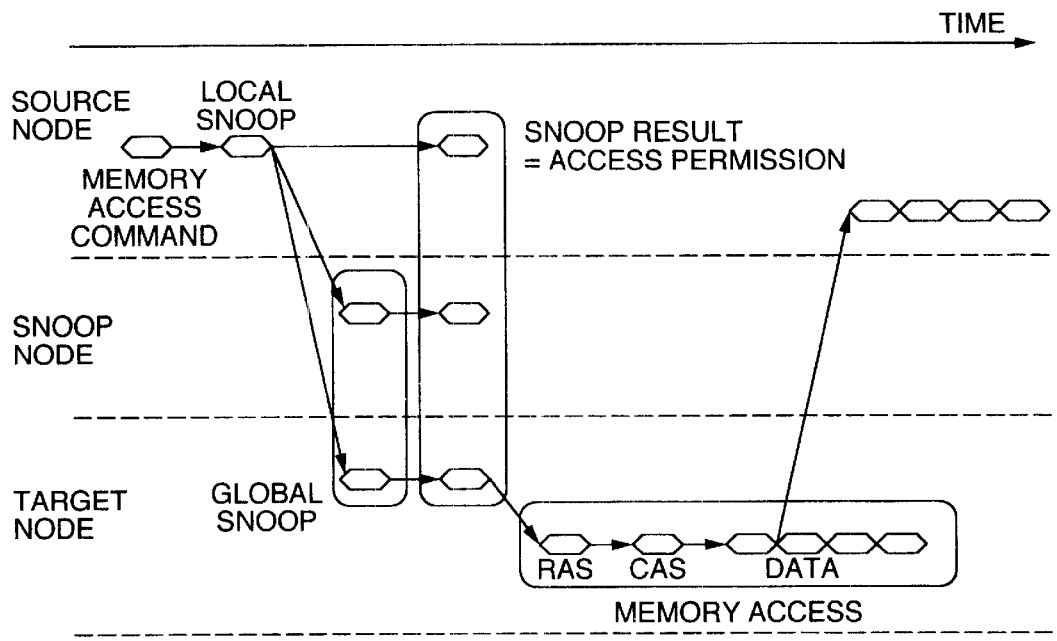
FIG. 7 is a time chart for showing the conventional memory access processing sequence.

FIG. 7 represents the normal memory access processing operation without using the ACTV command. An abscissa shows time, and a longitudinal direction shows a source node, a snoop node, and a target node. Also, a memory access command handled as this comparison example, is equal to a memory read command in combination with return data from a memory of another node. This may be similarly applied to a memory write command and an access to the own node.

When a memory read command is issued in the source node, a local snoop is carried out within the source node and it can be seen that the memory access is required. Thereafter, the memory access command is transferred to both the snoop node and the target node. In the snoop node and the target node, this memory access command is received to execute a global snoop. The results of the snoop for all of these nodes are totalized which may determine whether the memory access is allowed, or not allowed.

As a result of the local snoop and of the global snoop, if the memory access is allowed, then the memory access operation is commenced at the target node. Since the target node memory is arranged by employing an elements with using a DRAM cell, a subject address is subdivided into RAS and CAS in the target node. These RAS and CAS are sequentially entered into the local memory so as to execute the memory access operation. The target node returns the read data from the memory to the source node.

Figure 8:
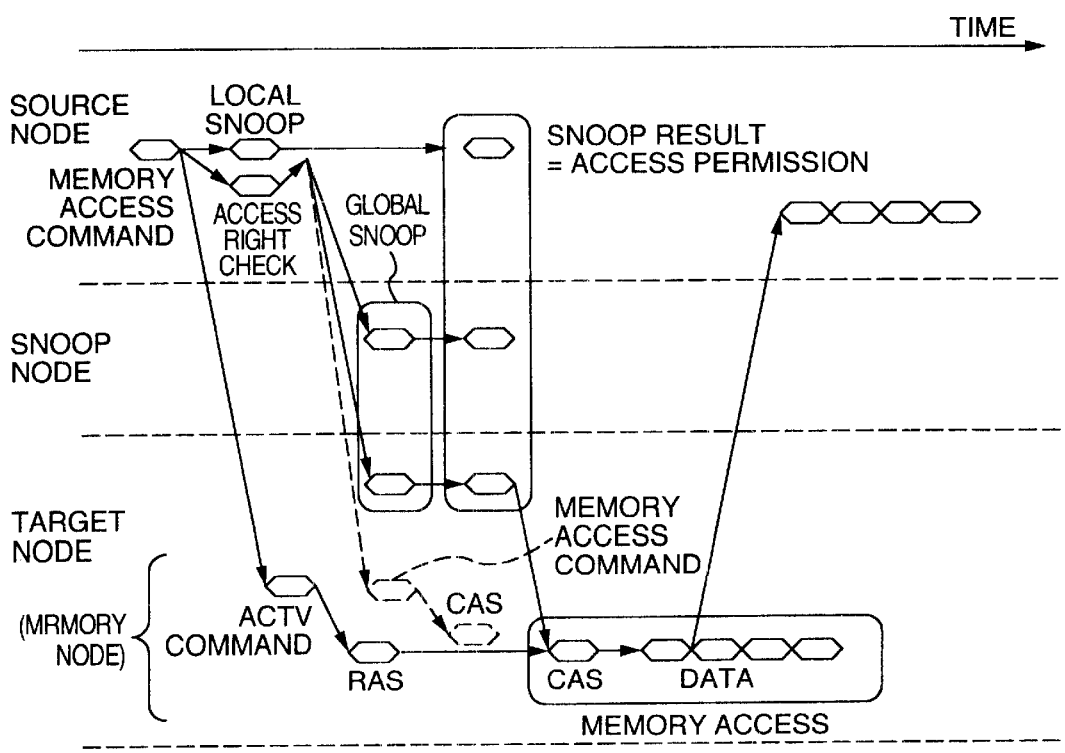
FIG. 8 is a time chart for representing a memory access processing sequence executed in the above-explained embodiment.

FIG. 8 represents a memory access processing operation in the case that an ACTV command is employed, in accordance with this embodiment. An abscissa and an ordinate of FIG. 8, and also a command to be handled are similar to those, as explained in FIG. 7.

In this embodiment, just after a memory access command has been transmitted from a processor to a processor bus of a source node, and before a local snoop is carried out, an ACTV command is sent to a target node. Since the target node receives the ACTV command, an RAS is outputted from a memory interface unit to a memory. The local snoop executed in the source node is performed in a similar manner to that of FIG. 7. However, before the result of this local snoop is obtained, a check is made as to whether or not an access right is present by retrieving an access right memory. In the case that either the access right is not present or a line containing a subject address is not registered into the access right memory, the global snoop is performed in a similar manner to the method shown in FIG. 7. As a result, if the memory access is allowed, then the memory access operation is carried out in the target node. Since the RAS has been previously entered into the memory of the target node in response to the ACTV command, a CAS is additionally designated and data is read out at this time.

In comparison with the memory access sequential operation shown in FIG. 7, in the memory access sequential operation according to this embodiment of FIG. 8, while the RAS with respect to the memory has been entered prior to the snoop result, the memory access sequential operation can be omitted in a process sequence executed after the snoop. As a result, as to the source node, the memory access latency can be shortened. This memory access latency corresponds to such a time period defined by that after the memory access command has been sent and until the data is returned. Normally, an interval for 2 to 4 cycles is required between an RAS and a CAS. Assuming now that one cycle is defined as 10 ns, the memory access latency can be shortened by 20 ns to 40 ns in accordance with the present invention. When it can be judged that the source node owns the access right by checking the access right, as indicated by a broken line of FIG. 8, the memory access command is transferred among the nodes only to the target node, and the target node which receives this memory access command immediately issues a CAS to the memory.

In other words, the global snoop is omitted. As a consequence, a busy rate of an address path can be stepped down. Also, the memory access latency can be furthermore shortened, as compared with that of the global snoop.

Also, in accordance with the present invention, only RAS is inputted to the memory without waiting for the snoop result. As a result, the actual data is not read out. As a consequence, in such a case that the memory access is not allowed due to the snoop result, there is such an effect that consumption of throughput of the memory can be avoided without producing useless memory access operation.

Furthermore, since the data is not read out, in the case that a plurality of memory access commands with respect to the same address are simultaneously present within the system, the present invention may own such a feature that the control operation can be easily carried out without invalidating the read data, which is different from the first-read system.

The above embodiment has described such an NUMA that the memories which constitute the main memory are distributed/arranged to the respective processor nodes. The substantially same transactions may be transferred even in such a UMA that the memory is used as the independent memory node. As described in FIG. 8, since the operation portions of the target node other than the global snoop are replaced by this memory node, this fact may be easily understood.

In this embodiment, in only one node among a plurality of nodes over the entire system, an access right is registered as to one cache line. In other words, this access right corresponds to an exclusive access right. In this case, even when the memory access is read, or written, there is no change in such an algorithm for judging as to whether or not a transfer destination of an access transaction is set only to a target node, or set to all of the nodes other than the own node.

Alternatively, a first modification may be realized. That is, an access right (shared access right) which can be shared at the same time by a plurality of nodes is registered into access right memories of the respective nodes. An algorithm for registering the shared access right is given as follows:

In such a case that a processor of the own node issues a memory access command required to execute a cache united control and also issues a global snoop request to another node, a state of the own node is registered as such a fact that the own node has the shared access right irrespective of the following condition, namely whether or not another node owns the shared access right of this memory block.

A fact that the own node has this shared access right indicates that there is the below-mentioned possibility. That is, as to a subject memory block, even another node is cached under Shared state. Accordingly, only when the memory access corresponds to the read access, while a check is made as to whether or not the source node owns the shared access right, the transfer destination of the memory access command is limited only to the target node.

Furthermore, as a second modification, the following arrangement may be achieved. That is, while discriminating an exclusive access right from a shared access right, the discriminated access right may be registered into an access right memory. In any one of the above-described embodiment and the first modification, the access right state can be registered by 1 bit. However, in the second modification, 2 bits are required in order to register 3 states, namely a non-access right state, a shared access right state, and an exclusive access right state.

Instead, in the second modification, when the memory access is the read access, while checking that the shared access right is owned by the source node, the transfer destination of the memory access command can be limited only to the target node. When the memory access is the write access, while checking that the exclusive access right is owned by the source node, the transfer destination of the memory access command can be limited only to the target node. In other words, the effect capable of stepping down the busy rate of the network by omitting the useless memory access transaction may be furthermore improved.

Next, referring now to FIG. 9, FIG. 10, and FIG. 11, a description will be made of another embodiment corresponding to a third modification. In a multiprocessor system of FIG. 9, a processor node 108 owns a local cache 111. Similarly, other processor nodes 109 and 110 own local caches, respectively. This structure of the multiprocessor is different from the multiprocessor system of FIG. 1, in which the local cache is added to each node. In this embodiment, the ACTV command which has been applied to the memory in FIG. 1 is issued to the local cache. Alternatively, issuing of the ACTV command with respect to the memory as explained in the embodiment of FIG. 1 may be combined.

Figure 9:
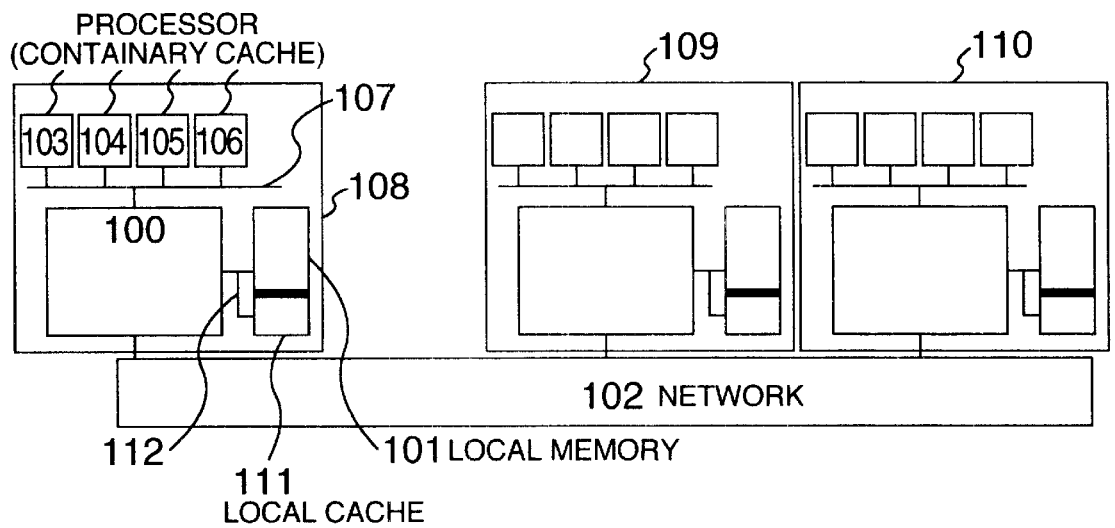
FIG. 9 is a schematic block diagram for indicating an overall arrangement of a system according to another embodiment of the present invention.

It should be noted that the local cache 111 of FIG. 9 may be arranged in such a manner that this local cache 111 is integrated on the same LSI as the node controller 100. Also, as shown in FIG. 9, as this local cache, another memory provided separately from the local memory may be used, and a portion of the local memory may be used.

Figure 10:
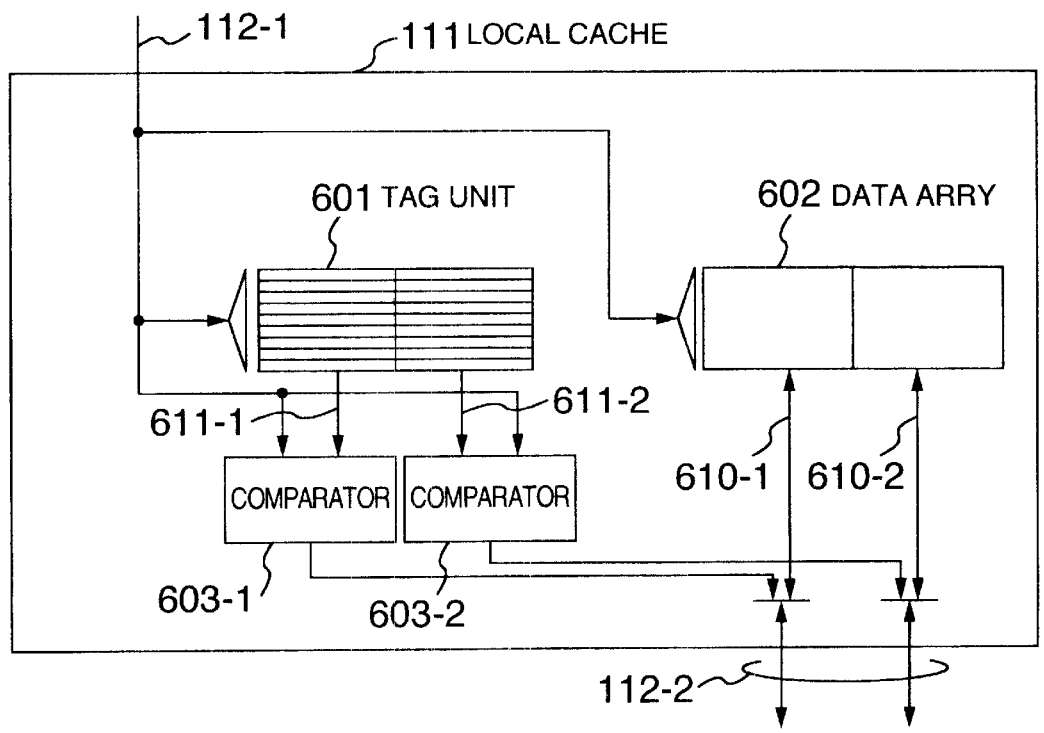
FIG. 10 is a schematic block diagram for indicating an arrangement of a local cache according to the second-mentioned embodiment.

FIG. 10 represents a structural example of the local cache. The local cache is constructed of a tag unit 601 and a data array 602. The local cache receives a memory access command as an input via a signal line 112-1, and transfers/receives data via another signal line 112-2.

This local cache owns both a notification function and a register function, while inputting thereinto both an address and data corresponding to a memory access issued from a processor. That is, when an access to this local cache is hit, the local cache notifies a completion of returning cache data, or a completion of an access operation. When an access to this local cache is missed, the local cache executes the memory access operation to the target node having the memory of this address, and registers the address and data into this local cache, if necessary. It should also noted that as to also this local cache, the local cache is controlled based on the state transition diagram shown in FIG. 6. Furthermore, even when the structural elements for constituting the local cache are made of either DRAM or SRAM, the present invention may be applied.

In accordance with this embodiment, there are two objects such that the ACTV command is applied to the cache. That is to say, a first object is to shorten data read time by previously inputting an RAS with respect to a data array. A second object is to shorten access time by previously performing a way selection when a multi-way is constructed.

As a consequence, such a memory access command which is sent out to the system bus because the cache built in the processor is missed is transferred via the system bus to the node controller 100. Other processors coupled to this system bus execute local snoop operations by using the memory access command sent out to the system bus. The ACTV command is sent to the local cache before executing the local snoop operation, or in parallel to this local snoop operation. In the local cache, the way selection is carried out and the tag is read by using the address contained in this ACTV command, and RAS inputted into the data array is performed in parallel to these way selection and the tag reading operation.

Figure 11:
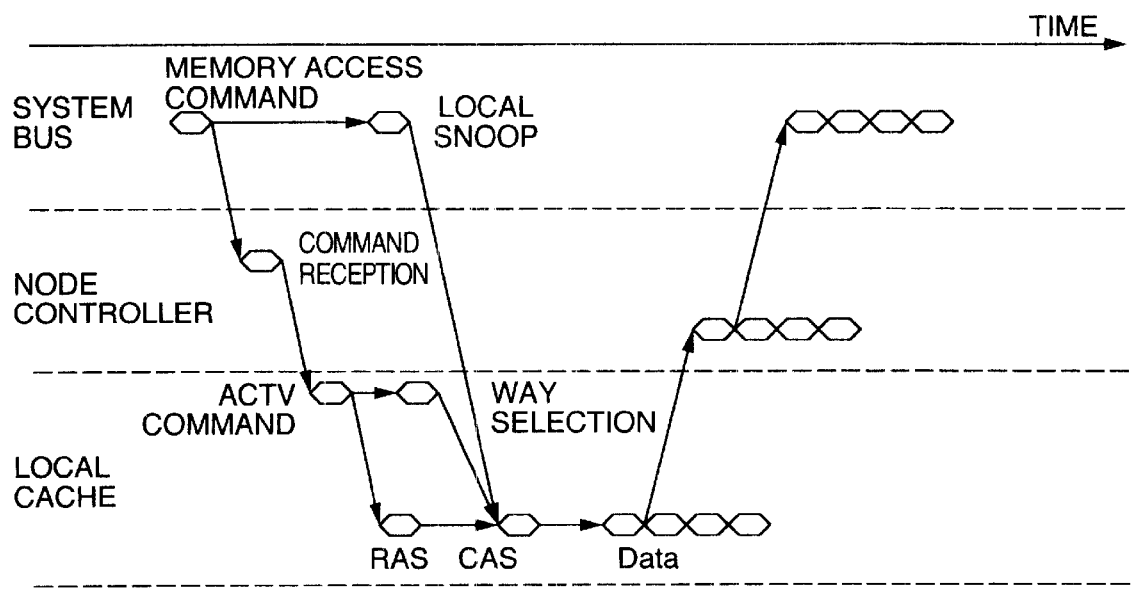
FIG. 11 is a time chart for indicating a local cache accessing sequence using an ACTV command, executed in the second-mentioned embodiment.

FIG. 11 presents a timing chart of a local cache access operation executed in the case that an ACTV command is employed. When a memory access command is sent out from a processor to a system bus, this memory access command is accepted by a node controller, and then the node controller issues an ACTV command is issued to a local cache by way of an one-to-one transfer operation. During this transfer operation, in the system bus, such a confirmation is made. That is, an address corresponding to this memory access command is not cached by another processor (namely, local snoop). In the local cache, the way selection is carried out based upon the address corresponding to this ACTV command, and furthermore, only RAS is entered into the data array. Thereafter, as a result of the local snoop operation and also as a result of the way selection (involving hit/miss judgement), if the data saved in the local cache must be accessed, then CAS is inputted so as to read the cache data corresponding to this address, and the data is transferred via the node controller to the system bus.

To the contrary, in the method without using the ACTV command, after waiting for the result of local snoop operation, the way selection is commenced. With respect to the data delay, after the way selection is performed, since AS and CAS must be sequentially inputted, it would take very long time until the data is acquired.

Similar to the above-explained embodiment of FIG. 1, in such a case that an access is issued not to a local cache, but to a local memory, a check is made of a caching possibility in another node by retrieving an access right memory. If there is no caching probability in another node, then a memory access command is transferred to a target node by way of an one-to-one transfer manner, and CAS is additionally designated in the target node so as to access a memory.

In accordance with the present invention, while the memory access request issued from the processor is subdivided into a plurality of commands, the preceding command is transferred to the access subject in an one-to-one correspondence based upon the address code so as to specify the access subject contained in the memory before the process operation such as the cache coincident control is carried out. After the cache coincident control has been carried out, if it is so judged that the actual memory access operation is performed, then the actual memory access operation is performed by the succeeding command. As a result, there is such an effect that the memory access latency can be reduced.

Also, in accordance with the method of the present invention, since the actual data reading operation is not carried out by the preceding command, as a result of the cache coincident control different from the conventional prereading system, in such a case that the memory access operation is not required, since the useless memory access operation is not carried out and the command is transferred based on the one-to-one transfer operation, there are the following effects. That is, the consumption of throughput can be prevented, and further, the throughput of the address is not consumed.

Furthermore, since the data is not read out by the preceding command, it is possible to easily control the ordering operations with respect to a plurality of memory requests while the multiprocessor is constituted.

What is claimed is:

1. A processor system containing a memory for constituting a main memory, a plurality of processor nodes, and a network for mutually coupling said plurality of processor nodes to said memory, each of said plural processor nodes including at least one processor unit which contains a cache for temporarily storing a portion of a memory block of said main memory;

wherein each of said processor nodes is comprised of:

first means for specifying a memory containing an address to be accessed as a target node in response to such a fact that a main memory access request is produced in a processor unit contained in the own processor node, and for issuing a first sort of command to said target node; and second means for judging as to whether or not there is such a possibility that the memory block containing the address to be access is stored into a cache of another processor node in response to said main memory access request;

for issuing a second sort of command to said target node when said judgment result is "no possibility"; and for distributing said second sort of command to all of the processor nodes other than the own processor node so as to execute a cache united control when said judgment result is "possibility"; and wherein said memory is accessed when said first sort of command is received and thereafter said second sort of command is received.

2. A processor system as claimed in claim 1, wherein said first sort of command corresponds to a command for specifying a row address within the address to be accessed of said memory; and said second sort of command corresponds to a command which additionally specifies a column address of said memory to execute a memory access operation.

3. A processor system as claimed in claim 1 wherein:
said memory is accessed in such a manner that the row address is designated by the received first sort of command, the cache united control is carried out among the respective processors by said second sort of command distributed to the processor node, and thereafter, the column address is designated by the received second sort of command.

4. A processor system as claimed in claim 1 wherein: each of said nodes contains a plurality of processor units; and
said second means executes the cache united control within the own processor and the own node, and thereafter issues said second sort of command.

5. A processor system containing a plurality of processor nodes, and a network for coupling said plurality of processor nodes with each other, each of said plural processor nodes including both a memory for constituting a main memory and also at least one processor unit which contains a cache for temporarily storing a portion of a memory block of said main memory; wherein:
each of said processor nodes is comprised of:
first means for specifying a processor node having a memory to which an address to be accessed is allocated as a target node in response to such a fact that a main memory access request is produced in a processor unit contained in the own processor node, and for issuing a first sort of command to said target node;
second means for judging as to whether or not there is such a possibility that the memory block containing the address to be accessed is stored into a cache of another node in response to said main memory access request; for issuing a second sort of command to said target node when said judgement result is "no possibility"; and for distributing said second sort of command to all of the processor nodes other than the own processor node so as to execute a cache united control when said judgement result is "possibility"; and
third means for inputting a portion of an access address into said memory based upon said first sort of command received from another processor node; and for inputting at least the remaining portion of said access address into said memory when an address to be accessed which is indicated by said second sort of command received from another processor node corresponds to the memory of the own processor node so as to execute a memory access operation.

6. A processor system as claimed in claim 4 wherein:
in such a case that said second sort of command received from another processor node corresponds to the commands distributed to said plurality of processor nodes, when a memory access operation is permitted as a result of snoop of a cache state of each of said processor units, said third means enters the remaining portion of said access address into said memory.

7. A processor system containing a plurality of processor nodes, and a network for coupling said plurality of processor nodes with each other, each of said plural processor nodes including both a memory for constituting a main memory and also at least one processor unit which contains a cache for temporarily storing a portion of a memory block of said main memory; wherein:
each of said processor nodes is comprised of:

first means for specifying a processor node having a memory to which an address to be access is allocated as a target node in response to such a fact that a main memory access request is produced in a processor unit contained in the own processor node, and for issuing a first command to said target node;
an access right memory for storing such information indicating as to whether or not each of the own processor nodes has an access right with respect to a plurality of memory blocks of said main memory; and
second means for retrieving said access right memory based upon the address to be accessed in response to an access request of said main memory; for issuing a second sort of command to said target node when said retrieved result indicates that the own processor node owns the access right; and for distributing said second sort of command to all processor nodes other than the own processor node in order to execute a cache united control when the retrieved result indicates that the own processor node does not own the access right, or said information is not stored into said access right memory; and wherein:
the memory of each of said processor nodes is accessed in such a manner that said processor node receives said first sort of command, and thereafter a second command is received.

8. An integrated circuit set used to constitute a processor system containing a plurality of processor nodes, and a network for coupling said plurality of processor nodes with each other, each of said plural processor nodes including both a memory for constituting a main memory and also at least one processor unit which contains a cache for temporarily storing a portion of a memory block of said main memory, comprising:
first means for specifying a processor node having a memory to which an address to be accessed is allocated as a target node in response to such a fact that a main memory access request is produced in a processor unit contained in the own processor node, and for issuing a first sort of command to said target node;
second means for judging as to whether or not there is such a possibility that the memory block containing the address to be accessed is stored into a cache of another node in response to said main memory access request; for issuing a second sort of command to said target node when said judgement result is "no possibility"; and for distributing said second sort of command to all of the processor nodes other than the own processor node so as to execute a cache united control when said judgement result is "possibility"; and
third means for inputting a portion of an access address into said memory based upon said first sort of command received from another processor node; and for inputting at least the remaining portion of said access address into said memory when an address to be accessed which is indicated by said second sort of command received from another processor node corresponds to the memory of the own processor node so as to execute a memory access operation.

9. In a method for transferring a transaction between a plurality of processor nodes and a memory for constituting a main memory, each of said plural processor nodes having at least one processor unit containing a cache for temporarily storing a portion of a memory block of said main memory, and said transaction being caused by a memory access request issued in one of said processor units, a transaction transferring method comprising the steps of:
transferring a first transaction used to designate a portion of an address to be accessed from a source node where said memory access request is produced to a target node having a memory to which the address to be accessed of said memory access request in an one-to-one correspondence;

transferring a second transaction to all of the processor nodes other than said source node so as to execute a global cache united control in such a case that after executing a local cache united control within said source node, there is a possibility that a memory block containing said address to be accessed is stored into a cache of a processor node other than said source node; and transferring said second transaction to said target node in such a case that there is no possibility that the memory block containing said address to be accessed is stored into the cache of the processor node other than said source node; wherein:

in said target node, the remaining portion of said address to be accessed is designated by said second transaction so as to execute the access operation to said memory.

10. In a method for transferring a transaction among a plurality of processors having both a memory for constituting a main memory and at least one processor unit containing a cache for temporarily storing a portion of a memory block of said main memory, said transaction being caused by a memory access request issued in one of said processor units, a transaction transferring method comprising the steps of:

transferring a first transaction used to designate a portion of an address to be accessed from a source node where said memory access request is produced to a target node having a memory to which the address to be accessed of said memory access request in an one-to-one correspondence;

transferring a second transaction to all of the processor nodes other than said source node so as to execute a global cache united control in such a case that after executing a local cache united control within said source node, there is a possibility that a memory block containing said address to be accessed is stored into a cache of a processor node other than said source node; and transferring said second transaction to said target node in such a case that there is no possibility that the memory block containing said address to be accessed is stored into the cache of the processor node other than said source node; wherein:

in said target node, the remaining portion of said address to be accessed is designated by said second transaction so as to execute the access operation to said memory.

* * * * *